May 15, 1962   D. G. GRISWOLD   3,034,544
HYDRANT VALVE
Filed Jan. 11, 1957   3 Sheets-Sheet 1
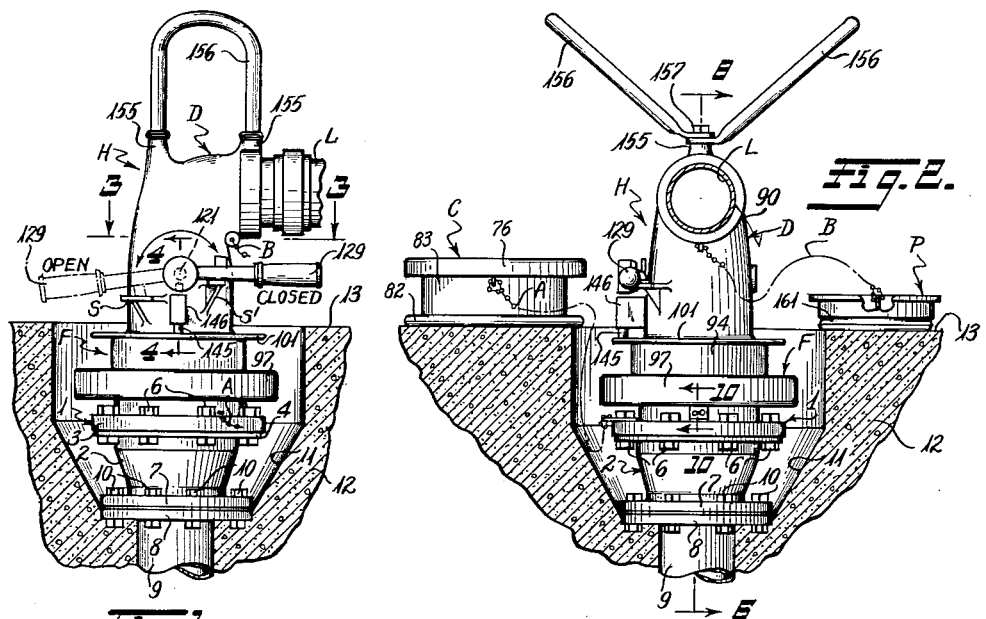
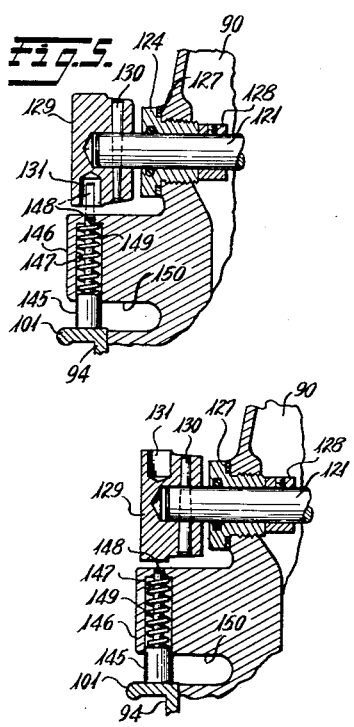
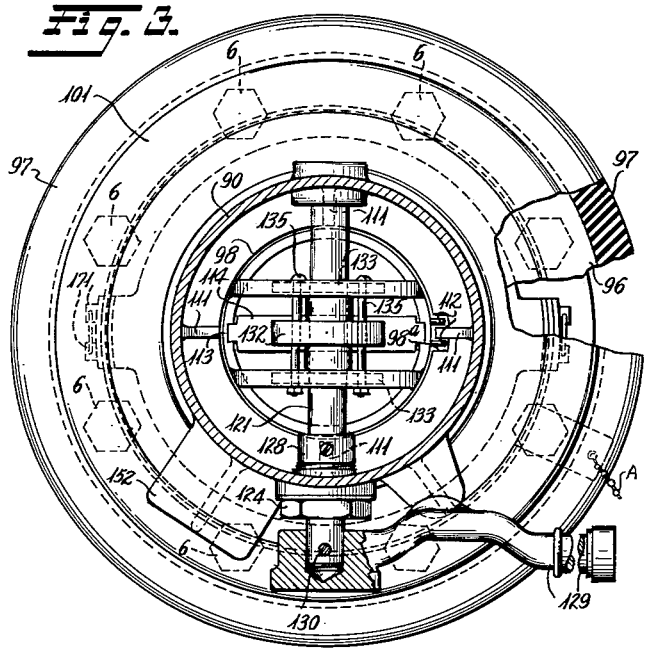
INVENTOR
Donald G. Griswold
BY Bacon & Thomas
ATTORNEYS

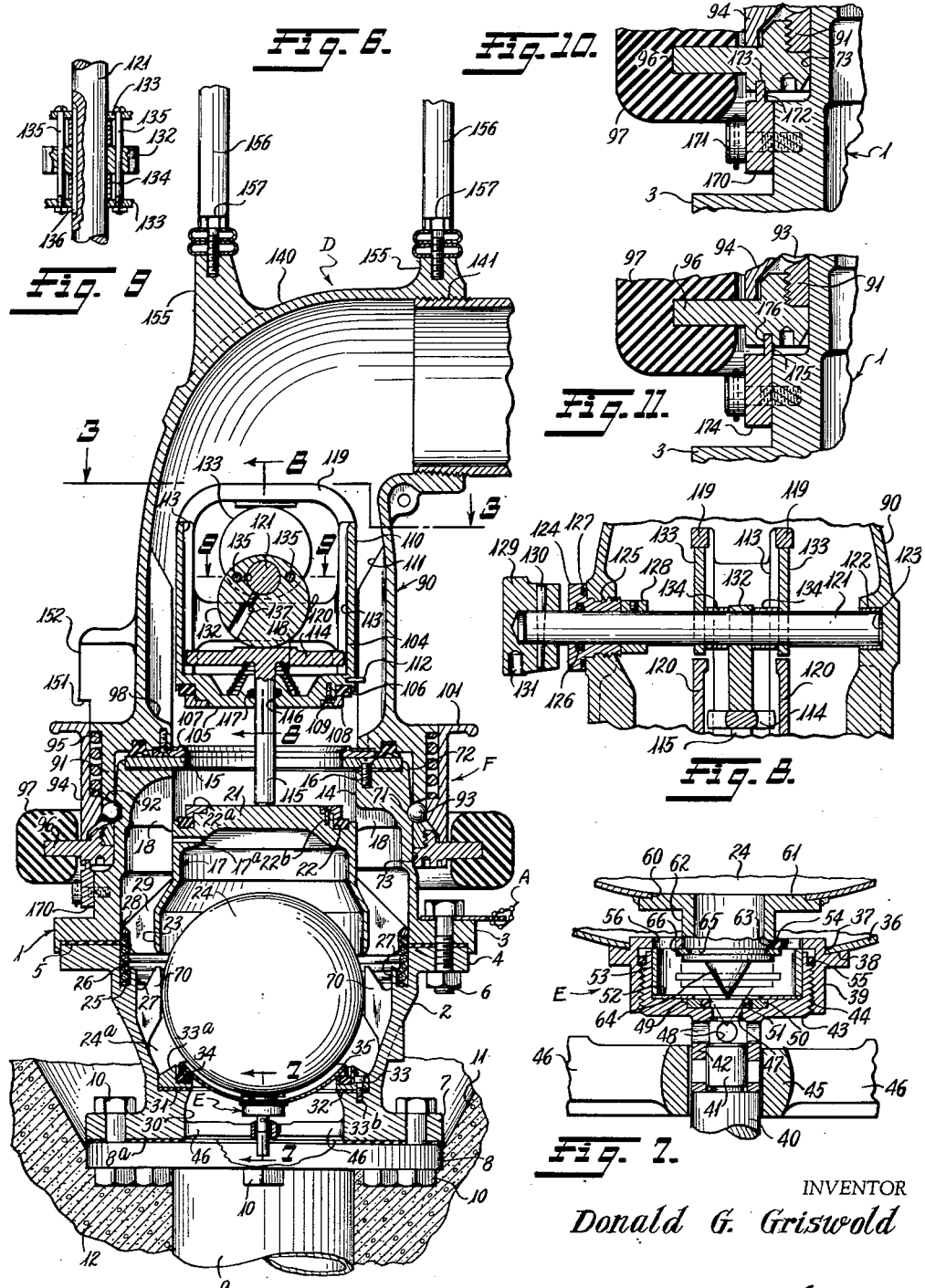

May 15, 1962
D. G. GRISWOLD
3,034,544
HYDRANT VALVE
Filed Jan. 11, 1957
3 Sheets-Sheet 3
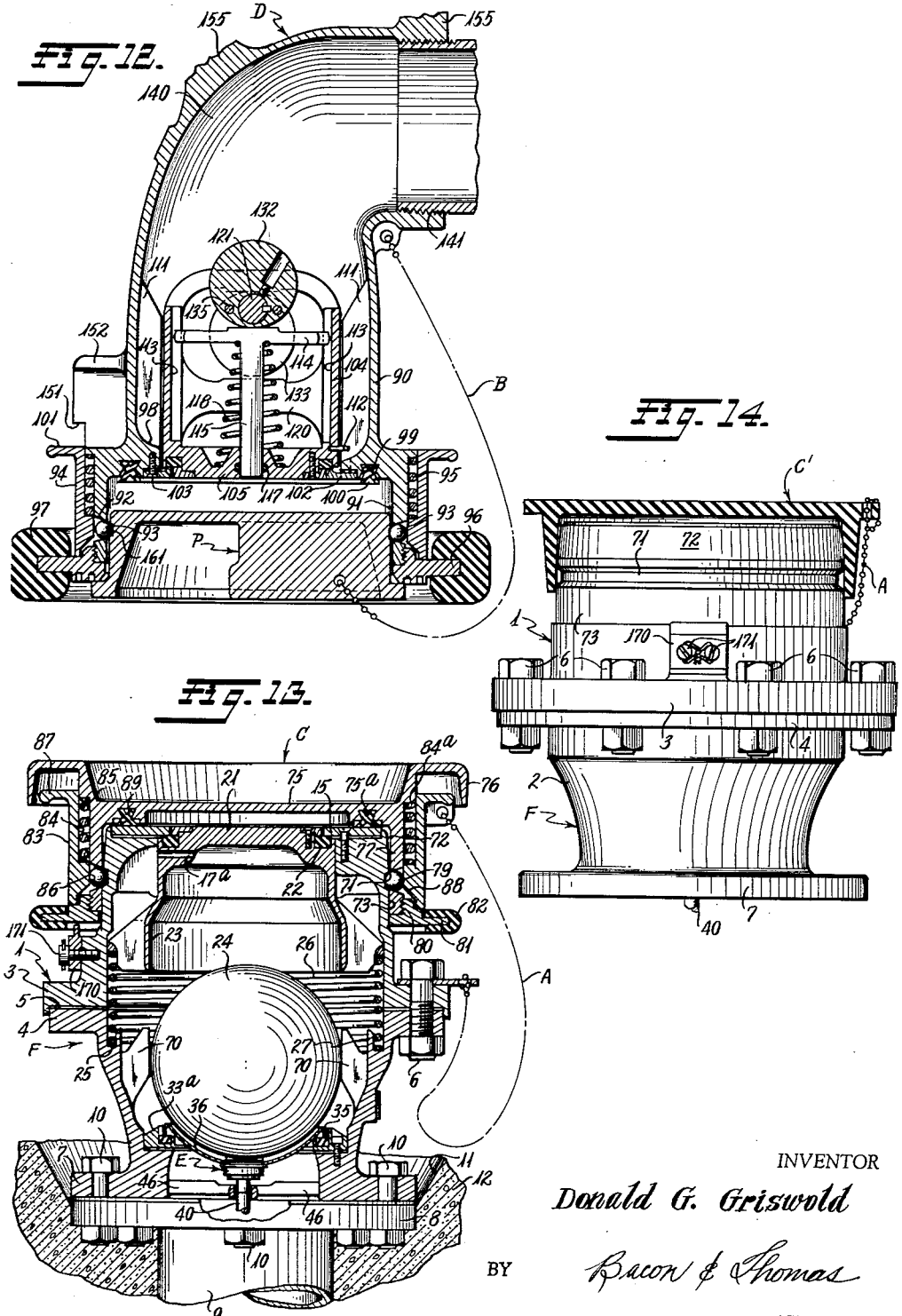
INVENTOR
Donald G. Griswold
BY Bacon & Thomas
ATTORNEYS 3,034,544
Patented May 15, 1962

3,034,544
HYDRANT VALVE
Donald G. Griswold, 4200 Seashore Drive,
Newport Beach, Calif.
Filed Jan. 11, 1957, Ser. No. 633,648
19 Claims. (Cl. 141—346)

This invention relates to hydrant valves, and more particularly to a hydrant valve for use in aviation refueling and defueling installations. In installations of this type, the pipelines are usually buried underground, as are also the fuel storage tanks and other necessary equipment. These fuel pipelines have terminals located below the surface at various fueling stations at the landing field.

The present hydrant structure consists of two valves, one of which is fixed or permanently attached to an end of a fuel pipe and is disposed in a recess with its upper extremity substantially flush with the ground level. The other valve is detachable from the fixed valve and designed to be quickly coupled and locked to the fixed valve. The detachable valve is connected to a hose leading to an aircraft or other apparatus for effecting a refueling or defueling operation. When the detachable valve is removed, the upper end of the fixed valve is manually covered by a tight-fitting dust cap to prevent contamination. Similarly, when the detachable valve is disconnected, its lower end is manually closed by a tight-fitting plug.

The design of the fixed and detachable valves is such that the detachable valve cannot be removed from the fixed valve at a time when the valves are open. The valves are further designed so that the detachable valve cannot be removed from the fixed valve unless both valves are fully closed. The valves are further constructed so that, when connected together to form a hydrant, they can be simultaneously opened or closed by the manipulaiton of a single operating handle. Cooperating locking means are associated with the fixed and detachable valves for positively locking the detachable valve to the fixed valve so that the two valves cannot accidentally come apart. The locking means includes a release member that is controlled by the hydrant operating handle. The arrangement is such that the detachable valve cannot be unlocked from the fixed valve except when the operating handle is in a position corresponding to the open position of both the fixed valve and the detachable valve.

The present hydrant can be used for either alternate or successive refueling or defueling operations. In this connection, the fixed valve includes a float-actuated main valve which automatically closes when air enters, or a vacuum condition is created in, the float chamber; and which automatically opens in response to line pressure during a refueling operation. The float valve has a relatively small, automatic equalizing or by-pass valve associated with it for balancing the pressure on the opposite sides of the float-actuated main valve for effecting automatic opening of the float-actuated main valve when a defueling operation is to be performed. The main float valve and its associated equalizing or by-pass valve are constructed so that the main float valve is responsive to a rise in the level of the fuel in the float chamber of the fixed valve structure, whereby, at the beginning of a defueling operation, the float is caused to rise slightly and first open the by-pass valve to equalize the pressure on the opposite sides of the main float valve, and to thereafter rise higher and open the main float valve and allow it to open instead of being held closed by the fuel in the float chamber of the fixed valve.

A further feature of the present hydrant structure is that the fixed and detachable valves may be provided with indexing means to assure that a given detachable valve intended to handle a particular fuel can be mounted only upon a fixed valve which handles the identical fuel.

The principal object of the invention is to provide a hydrant structure that can be used for either refueling or defueling operations.

Another object is to provide a hydrant structure including fixed and detachable valves which cannot be detached from each other except when in fully closed position.

Another object is to provide a hydrant structure including fixed and detachable valves connected together by a quick-release locking coupling, and which coupling can be released only when the valves are in their closed position.

Another object is to provide a hydrant structure including a detachable valve having an operating handle and lock releasing pin for said handle arranged so that the operating handle must be actuated to valve closing position before the detachable valve can be detached from the remainder of the hydrant structure.

A further object is to provide a hydrant including a novel float valve located in a float chamber in the fixed valve and arranged so as to be uninfluenced by the normal flow of liquid fuel in either direction, but which is arranged to automatically close the fixed valve by gravity in the event of air or gas entering the float chamber through the detachable valve, thereby to prevent the entrance of air or gas into the piping system connected with the fixed valve.

Still another object is to provide a hydrant having an automatically operable pressure equalizing or by-pass valve to equalize the pressure across the float-controlled valve and initiate defueling even in the event that a vacuum condition exists in the pipe line connected with the downstream side of the float-controlled valve.

Other and further objects of the invention will be apparent from the following description taken in conjunction with the accompanying drawings, in which:

FIG. 1 is a side elevational view of the hydrant showing the fixed and detachable valves connected together, the operating handle being shown in full lines in the position wherein both valves are closed, and being shown in dot-and-dash lines in the position wherein both valves are open;

FIG. 2 is a front elevational view of the hydrant shown in FIG. 1;

FIG. 3 is an enlarged sectional view through the detachable valve taken on the line 3—3 of FIGS. 1 and 6;

FIG. 4 is a fragmentary sectional view taken on the line 4—4 of FIG. 1 showing the operating handle in a position to prevent the detachable valve from being unlocked from the fixed valve;

FIG. 5 is a view similar to FIG. 4 but showing the operating handle in a position corresponding to the closed position of both valves and wherein the handle is positioned to cooperate with the lock-releasing pin to permit the detachable valve to be removed from the fixed valve;

FIG. 6 is a vertical sectional view through the hydrant taken on the line 6—6 of FIG. 2;

FIG. 7 is a fragmentary sectional view through the float-operated equalizing valve associated with the main float-operated valve, taken on the line 7—7 of FIG. 6;

FIG. 8 is a fragmentary vertical sectional view taken on the line 8—8 of FIG. 6, showing certain details of the shaft and eccentrics for actuating the valve discs or closure elements of the fixed and detachable valves;

FIG. 9 is a horizontal sectional view through the operating shaft and eccentrics taken on the line 9—9 of FIG. 6;

FIG. 10 is an enlarged fragmentary sectional view taken on the line 10—10 of FIG. 2, illustrating a lug secured to the fixed valve and cooperable with a groove in a bumper ring on the detachable valve for preventing the mounting of other than an appropriate detachable valve upon the fixed valve;

FIG. 11 is a view similar to FIG. 10, but shows a different type of lug for association with a detachable valve having a groove of a different diameter from that in FIG. 10;

FIG. 12 is a vertical sectional view through the detachable valve showing the valve removed from the fixed valve and having its open end closed by a rubber plug;

FIG. 13 is a vertical sectional view through the fixed valve showing its open end closed by a metallic cap structure which is locked in place by a locking device similar to that carried by the detachable valve; and FIG. 14 is an elevational view of the fixed valve with a non-metallic closure cap frictionally mounted thereon in lieu of the metallic cap shown in FIG. 13.

Referring to the drawings, the hydrant structure is generally identified by the letter H and comprises a fixed valve F and a detachable valve D. The fixed valve F includes a body having an upper section 1 and a lower section 2. The body sections 1 and 2 are provided with flanges 3 and 4, respectively, FIG. 6, having a gasket 5 disposed therebetween. Bolts 6 extend through flanges 3 and 4 and secure the body sections together. The body section 2 has a flange 7 at its lower end attached to a corresponding flange 8 on one end of a fuel pipe 9. The flanges 7 and 8 have a gasket 8a therebetween and are secured together by bolts 10. The valve F is mounted in a recess 11 formed in a body of concrete 12. The recess 11 is deep enough so that the upper end of the valve F lies slightly below the surface level 13 of the concrete 12.

The upper end of the body section 1 has an inwardly extending flange 14 upon which is mounted a ring or valve seat 15, secured in place by countersunk screws 16. A valve element 17 in the general form of a hollow piston is guided, in part, for axial movement in the valve section 1 by a plurality of ribs 18 extending inwardly from the cylindrical side wall of the body section 1. The head of the piston-like valve element 17 serves as a valve disc 21 and is recessed to receive a sealing ring 22 for engagement with the underside of the seat 15, whereby to seal the upper end of the fixed valve F. A flanged ring 22a is secured to the valve element 17 by screws 22b and holds the sealing ring 22 in place. The upper surface of the valve disc 21 is substantially flush with the upper face of the ring 15 when the valve element 17 is in fully closed position, as shown in FIG. 13. The valve element 17 includes a cylindrical skirt 23, FIG. 6, that is enlarged at its lower end to partially receive a ball float 24. A radial passage 17a is formed in valve element 17 above the skirt 23. This passage establishes communication between the interior of the valve element 17 above the ball float 24 and a float chamber 24a formed by the body sections 1 and 2.

The lower body section 2 has a shoulder 25 that forms a seat for one end of a helical compression spring 26. The lower end of the spring 26 is retained on the shoulder by upwardly projecting lugs 27. The upper end of the spring 26 engages a guide ring 28 formed integral with radial webs 29 extending outwardly from the skirt 23. The guide ring 28 slidably contacts the cylindrical wall of the body section 1, and its lower side is engaged by the upper end of the spring 26, so that the spring 26 constantly urges the valve element 17 upwardly toward closed position against the seat 15.

The lower body section 2 has a passage 30 that is in constant communication with the pipe 9. A shoulder 31 surrounds the passage 30 and has a gasket 32 and a ring 33 having an upper deflecting surface 33a secured thereby by screws 33b. A sealing ring or valve seat 34 is mounted in an annular recess formed in the ring 33 and is engaged by a valve element or down-turned rim 35 extending from a plate 36. This plate is in the form of a fragment of a sphere. A central opening 37, FIG. 7 in the plate 36 seats around a shoulder 38 on a body part 39 of an equalizing valve E. The plate 36 is brazed or otherwise secured to the shoulder 38 in sealed relation. The equalizing valve E includes a guide stem 40 with a reduced end 41 that projects into a hollow boss 42 depending from a cup-shaped member 43 constituting another part of the valve body and which is threadedly engaged at 44 with the valve body 39. The stem 40 and boss 42 ride in a guide 45 centered in the passage 30 by radiating arms 46. The member 43 has a central port 47 that communicates with the interior of the boss 42— and radial ports 48 that establish communication between the interior of said boss and the passage 30. The member 43 also has a recess 49 above and surrounding the port 47. A metal ring 50 is received in said recess and a rubber sealing ring 51 is disposed within and may be bonded to the ring 50. An annular plate 52 overlies the ring 50 to hold it in place. The lower edge of a hollow cylindrical sleeve 53 engages the outer margin of the plate 52. The upper edge of the sleeve 53 engages a wall 54 extending across the top of the valve body 39. The sleeve 53 clamps the annular plate tightly in place as the member 43 is threaded into the body 39. An O-ring packing 55 forms a seal between the member 43 and valve body 39. The wall 54 has a series of circumferentially spaced ports 56 that communicate with the interior of the sleeve 53.

The ball float 24, FIG. 7, has an opening 60 formed in its lower side and a shouldered guide 61 is soldered or brazed in said opening in fluid tight relation, so that no liquid can gain access to the interior of float 24. A cylindrical portion 62 of the guide 61 is slidably mounted in an opening 63 in the wall 54 of the valve body 39 and has a conical plunger 64 that is adapted to engage the sealing ring 51 to prevent flow in one direction through the port 47. The plunger 64 is shown in full lines in its open position in FIG. 7 and shown in dot-and-dash lines in its closed position. The guide portion 62 has a groove 65 for a split snap ring 66. The ring 66 is engageable with the lower face of the wall 54 to limit upward movement of the float 24 relative to the assembly of the spherical plate 36 and body 39. The manner in which the float 24 actuates the plunger 64 of the equalizer valve E to by-pass fuel to equalize the pressure across the main float-operated valve 34—35 during a defueling operation will be described in detail hereinafter.

Referring to FIG. 6, the body section 2 of the fixed valve F contains a plurality of radial guide ribs 70 which guide the float 24 for vertical movement in the float chamber 24a. The internal diameter of the skirt 23 of the valve element 17 is large enough to receive the float 24 as it rises to permit flow through the passage 30.

The upper body section 1 is provided in its outer surface with an annular locking groove 71. The external surface of the section 1 above the groove 71 is slightly tapered upwardly, as indicated at 72; whereas, the external surface 73 below said groove is truly cylindrical.

Referring to FIG. 13, the upper end of the fixed valve F is adapted to be covered by a metallic dust cap C. The cap C has a depressed top wall 75 surrounded by a flanged rim 76. A cylindrical skirt 77 extends downwardly from the top wall 75 and has a plurality of circumferentially spaced, outwardly tapered openings 78 in the same horizontal plane as the locking groove 71. A spherical latching ball 79 is disposed in each opening 78. The lower portion of the skirt 77 is threaded at 80 and has a flanged guard ring 81 mounted thereon. A rubber bumper element 82 is mounted on the flange of the guard ring 81.

A cylindrical locking ring 83 is slidably mounted upon the skirt 77 of the cap C. The locking ring 83 has an internal recess 84 to receive a compression spring 85. The cap C has a shouldered portion 84a that rides in the recess and forms an abutment for one end of the spring 85, which is arranged so that it tends to continuously urge the locking ring 83 in a locking direction toward the guard ring 81. The locking ring 83 has a plain, internal cylindrical surface 86 which engages the balls 79 when the locking ring is in its lowermost position and retains said balls in the locking groove 71 so that the cover C is locked on the fixed valve F. The locking ring 83 also has an outwardly and downwardly beveled surface 88 below the cylindrical surface 86. The upper end of the locking ring 83 has an outwardly extending finger flange 87 lying within the cap rim 76, and is thus protected against damage. This flange is adapted to be engaged by the fingers and to be pressed upwardly within the rim 76 against the force of the spring 85. As the locking ring 83 is moved upwardly to a position in which the cylindrical surface 86 is above the balls 79, and the beveled surface 88 assumes a position confronting the balls, said balls are released and move by gravity out of the locking groove 71 and thus release the dust cap C so that it can be bodily lifted upwardly and removed from the fixed valve F. The dust cap C can be remounted by positioning it on the valve body section 1, pressing the finger flange 87 into the rim 76 to permit the balls 79 to retract and assume a position opposite the groove 71, and then releasing the flange 87 so that the beveled surface 88 can cam the balls 79 into positive locking position as the locking ring 83 is forced downwardly by the spring 85.

The top wall 75 of the dust cap C has an annular groove 75a formed in its interior in which is mounted a packing ring 89 that automatically engages the upper side of the seat 15 to form a seal therewith as the cap is locked in position on the fixed valve F. This seal prevents flow from the fixed valve, even in the event that minor leakage past the sealing ring 22 should develop while the cap C is in place. The cap C is conveniently retained in close proximity to the fixed valve F, when not in use, by a chain A interconnecting the two.

The detachable valve D is interchangeable with the dust cap C and includes a valve body 90, FIG. 6, having a cylindrical skirt 91 similar to the skirt 77, adapted to similarly surround the upper portions 72 and 73 of the body section 1 of the fixed valve F. The skirt 91 is provided with tapered apertures 92 to receive latching balls 93. A locking ring 94 surrounds the skirt 91 to retain the balls 93 in the locking groove 71. A compression spring 95, similar to the spring 85, normally urges the locking ring 94 in a direction downwardly relative to the valve section 1. A bumper guard ring 96 is threaded onto the lower end of the skirt 91. A rubber bumper guard ring 97, similar to but larger than the bumper guard ring 82, is mounted upon the guard ring 96 to protect the lower end of the detachable valve from damage during handling.

The valve body 90 has an inwardly extending flange 98 adjacent the upper end of the skirt 91. The lower face of the flange 98 is provided with an annular recess 99 in which a sealing ring 100 is mounted. This sealing ring engages the seat ring 15 to form a seal therewith when the detachable valve D is mounted upon the fixed valve F, as shown in FIG. 6. The locking ring 94 has a flange 101 that is engageable by the fingers for moving the locking ring 94 upwardly relative to the skirt 91 to release the latching balls 93 in the same manner described in connection with the dust cap C, to unlock the detachable valve D from the fixed valve F.

The flange 98 of the valve body 90 of the detachable valve D is recessed at its inner edge and has a seating ring 102 secured thereto by screws 103. Mounted within the valve body 90 is a valve element 104 including a valve disc 105 at its lower end. This element is recessed to receive a sealing ring 106 which engages a ridge 107 on the upper face of the ring seat 102 to prevent flow through the valve D. The sealing ring 106 is secured to the element 104 by a ring 108 and screws 109.

The valve element 104 includes a tubular portion 110 which extends upwardly from the disc 105 in concentric relation with the valve body 90 and is guided for vertical movement within the valve body 90 by radial ribs 111 extending inwardly from said body. A pair of pins 112 extend outwardly from the valve element 104 and cooperate with opposite sides of one of the ribs 111 (FIG. 3) to prevent said valve element from rotating. The flange 98 is recessed at 98a to permit entry of the pins 112 of the valve element 104 into the valve body 90 during assembly.

The valve element 104 is provided with diametrically opposed channels or grooves 113. A cross bar 114 extends between and is guided in the grooves 113. A stem 115 extends downwardly from the cross bar and through an opening 116 in the valve disc 105. A sealing ring 117 surrounds the stem 115 and a compression spring 118 is interposed between the disc 105 and the cross bar 114 and tends to move the valve disc 105 downwardly and away from the bar 114. On opposite sides of and parallel with cross bar 114 are upper webs 119 and lower webs 120.

A horizontal shaft 121, FIG. 8, has one end thereof journalled in a bushing 122 mounted in a recess 123 in the valve body 90. The shaft extends through the valve element 104 and its opposite end projects through a plug 124 mounted in a threaded opening 125 in the valve body 90. An O-ring 126 is mounted in the plug 124 and forms a seal around the shaft 121. Another O-ring 127 is mounted in a recess in the head of the plug 124 and forms a seal with the valve body 90. A collar 128 is mounted on the shaft adjacent the inner end of the plug 124, secured to the shaft by a set screw, and restrains the shaft 121 against longitudinal movement. An operating handle 129 is secured to the outer end of the shaft 121 by a pin 130. The handle 129 has a radial recess 131 formed therein for a purpose which will be described later.

An eccentric 132 is mounted on the shaft 121 between the webs 120 and its periphery engages the cross bar 114. A pair of eccentrics 133 is mounted on the shaft 121 in vertical alignment with the webs 119 and 120. The eccentrics 133 are maintained spaced from the eccentric 132 by sleeves 134, FIGS. 8 and 9. The eccentrics 133 are displaced approximately 180° relative to the eccentric 132 and are adapted to engage the webs 119 and 120. The eccentrics are maintained in this relationship by bolts 135, which extend through all three of the eccentrics. A conventional key 136 secures the eccentrics against rotation relative to the shaft 121. A set screw 137, FIG. 6, mounted in the central eccentric 132 engages the shaft 121 to prevent axial movement of the eccentric assembly on said shaft.

The arrangement of the eccentrics 132 and 133 is such that, upon rotation of the shaft 121 by the operating handle 129 the eccentric 132 forces the cross bar 114 and stem 115 downwardly, while the eccentrics 133 raise the valve element 104 and valve disc 105 of the valve D into valve opening position, as shown in FIG. 6. This action compresses the spring 118. The lower end of the stem 115 bears against the valve disc 21 of the valve F and simultaneously forces it into its open position, compressing the spring 26. Thus, as the operating handle 129 is rotated counterclockwise, as viewed in FIG. 1, into engagement with a stop S, the fixed valve F and the detachable valve D are simultaneously opened. The handle 129 must be rotated through an angle slightly greater than 180° so that the eccentric 132 is slightly past dead-center and cannot accidentally be rotated by the force of the springs 26 and 118 or the pressure of the liquid flowing through the valve. Upon movement of the operating handle 129 clockwise into engagement with a stop S, both valves are closed, the disc 21 of the valve F being held closed by the spring 26, and the disc 105 of the valve D being held closed by the action of the spring 118.

The upper end of the valve body 90 is curved to form an elbow portion 140 terminating in a laterally directed, threaded opening 141 to permit the detachable valve D to be connected to a hose or fuel line L, as shown in FIG. 1.

It is desirable that the valve D be maintained locked on the valve F when the hydrant valve H is in operation. This is accomplished by a locking pin 145, FIGS. 4 and 5, which is slidably mounted in a boss 146 located at the side of the valve body 90 and directly below the end of the operating handle 129 that is fixed to the shaft 121. The pin 145 is slidably mounted in a counterbored opening 147 in the boss 146. The pin 145 has an extension 148 of reduced diameter at its upper end that is adapted to be projected through the small end of the reduced bore 147. A spring 149 is mounted in the large portion of the opening 147 and continuously urges the pin 145 downwardly into engagement with the flange 101 of the locking ring 94. The pin extension 148 is receivable in the recess 131 of the operating handle 129 when the handle is in a position corresponding to the "Closed" position of the valve elements in the hydrant valve H. Thus, as illustrated in FIG. 5, the pin extension 148 can be raised to the position shown in dot-and-dash lines in the recess 131 when the locking ring 94 is moved upwardly to unlock the valve D for removal from the valve F. On the other hand, when the operating handle 129 is in the "Open" position, the opening 131 is above the plane of the shaft 121 and an imperforate portion of the handle 129 lies directly above the pin extension 148, thereby preventing the locking ring 94 from being raised.

When the operating handle 129 is in the "Open" position, upward movement of the locking ring 94 is limited by engagement of its flange 101 with the under side 150 of the boss 146. Such upward movement is further limited by a shoulder 151, FIG. 6, formed on a rib 152 extending from the valve body 90.

It will be apparent from the foregoing that, although the locking ring 94 is capable of maintaining the detachable valve D on the fixed valve F, nevertheless the locking pin 145 cooperates with the operating handle 129 to prevent the valve D from being removed from the valve F unless both valves are fully closed.

In order to facilitate handling and carrying of the detachable valve D, the elbow portion 140 thereof is provided with bosses 155 to which flattened ends of replaceable tubular handles 156 are secured by cap screws 157.

Contamination of the valve D is prevented by inserting therein a metal plug P, FIG. 12. The plug P has an annular locking groove 161, which cooperates with the latch balls 93 in the same manner as the groove 71 of the valve F, to maintain the valve D and plug P in locked relation. The plug P is maintained in close proximity to the valve D by a chain B.

Referring to FIG. 14, the valve F is shown provided with a non-metallic cap C' frictionally fitted thereon in lieu of the locked-on cap C.

It is also desirable to provide means to assure that a hose line L handling a particular kind of fuel can be connected only to a pipe line handling the identical fuel. Accordingly, a synchronizing lug generally indicated at 170 in FIGS. 6 and 10 is provided to prevent a quick-coupling detachable valve from being mounted upon a fixed valve F supplying a fuel other than that fuel which is specified for the equipment. Two lugs are mounted on diametrically opposite sides of the valve body section 1 of the valve F and are secured in place by cap screws 171. Each lug 170 has a narrow ridge 172 extending upwardly, centrally from its top side. The ring 96 of the quick coupling means on the detachable valve D has an annular groove 173 in its lower face to accommodate the ridge 172 on the lugs 170. The groove 173 must be of a predetermined diameter to receive lug ridges 172, otherwise the lugs render it impossible to mount the detachable valve D on the fixed valve F. The predetermined diameter of the groove 173 corresponds to a given type of fuel. To prevent intermixing of fuels, a different diameter groove and a differently designed lug ridge are employed on the fixed and detachable valves. For example, in FIG. 11, a lug 174 has a ridge 175 which projects from its top at its inner side into a groove 176 in the quick coupling means, and which groove 176 is smaller in diameter than the groove 173 in the quick coupling means shown in FIG. 10. The different diameter grooves and the different ridge designs shown in FIGS. 10 and 11 obviously would serve to prevent a detachable valve having the quick coupling means shown in FIG. 10 from being mounted upon the fixed valve shown in FIG. 11 and vice versa.

Operation of the hydrant valve H is as follows:

When the fixed and detachable valves F and D are separated, the valve discs 21 and 105, respectively, are in their closed position, shown in FIGS. 12 and 13, so that both the fuel pipe line 9 and hose or fuel line L are sealed. The dust cap C is removed by pressing and drawing upwardly on the finger flange 87 of the locking ring 83 to release the latch balls 79, as previously described. The valve D is substituted by first raising its locking ring 94 to release the latch balls 93, and then forcing the lower end of the valve body 90 onto the body section 1, also as previously described.

After valve D has been mounted on the valve F, the handle 129 is moved to its "Open" position, causing the eccentrics 132 and 133 to spread the valve discs 21 and 105 apart so as to provide an open passage between the pipe 9 and the hose L, as shown in FIG. 6.

So long as the hydrant valve H is filled with liquid to a point above the ball float 24, liquid fuel may flow in either direction. Such flow has little or no effect on the float 24, for the buoyancy of the float maintains it within the skirt 23 of the valve element 17. Should the liquid level drop in the float chamber 24a, the float 24 likewise drops and engages the valve element 35 with the sealing ring or seat 34, closing the passage 30.

Thus, in the operation of refueling an aircraft, for example, the pressure of fuel will raise the float 24 and fuel will flow upwardly through the hydrant valve H. Should the fuel hose L break, necessitating the stopping of fuel flow through the hydrant valve and the fuel level drops in the chamber 24a, or for any other reason should air or gas enter the chamber 24a, the float-operated valve 34—35 automatically closes to prevent the air or gas from entering the fuel supply pipe 9.

During a static condition, that is to say, when no liquid fuel is being discharged through the hose line L, or flowing in a reverse direction from the hose line L, to the fuel pipe P, the float remains unseated due to the buoyant effect of the liquid fuel and the valve 34—35 remains open.

Similarly, in the operation of defueling an aircraft, for example, as soon as the liquid fuel in the hose line L has been depleted and the fuel level in the float chamber 24a drops sufficiently, the float-operated valve 34—35 automatically closes to prevent entrance of air or gas into the pipe 9.

In the event a pressure differential exists across the float 24 and it remains seated, preventing initiation of a defueling operation, the by-pass or equalizing valve E automatically will function to equalize the pressure above and below the main float-operated valve 34—35, so that the float 24 will be raised by the buoyant force of the returning fuel and the defueling operation may then proceed.

It will be appreciated from the foregoing that the float 24 really actuates two separate valves. One of these valves has been referred to as a main float-operated valve and comprises the ring 33 having the sealing ring or seat 34 mounted thereon and the valve element or downturned rim 35 on the plate 36. The other valve comprises the conical plunger 64 and the flexible sealing ring 51 and has been referred to as the equalizer valve E. The sealing ring 51 is rounded at its inner periphery and thus affords a minimum of seating area for the plunger 64, thus avoiding any possibility of the plunger sticking.

The opening operation of the float controlled equalizer valve E during a defueling operation is as follows:

With the main float-operated valve 34—35 in its closed position, that is, the valve element or downturned rim 35 engaged with the sealing ring or seat 34, and a differential pressure existing thereacross, in order to establish a defueling operation, fuel is allowed to flow to the hydrant H through the hose L connected to the valve D. When the fuel enters the chamber 24a in the valve F, it enters the space between the float 24 and the plate 36 and automatically raises the float slightly, or until the snap ring 66 contacts the wall 54 of the equalizer valve body 39. At the same time, the plunger 64, which is attached to the float 24, is raised from its seat 51, thereby opening a passage across the main float-operated valve 34—35. Fuel may then flow from the chamber 24a between the float 24 and the plate 36, pass through the ports 56 and then flow through the open equalizer valve 64—51, and finally through the ports 48 into the passage 30 below the then closed valve 34—35.

When the pressures on both sides of the main float-operated valve 34—35 are equal, there is no longer a pressure differential tending to offset the lifting force of the float 24 and hold it down. Hence, the float 24 rises further, lifting with it the plate 36, thereby opening the main passage 30 through the hydrant.

As the last of the fuel passes through the hydrant H at the end of a defueling operation, the float 24 descends, as the level of the fuel descends, into the chamber 24a until the valve element or downturned rim 35 on the plate 36 engages with the sealing ring or seat 34 to shut off flow through the main passage 30. The float 24 is still buoyantly supported at the time that the main float-operated valve 34—35 closes, and fuel will continue to pass through the equalizer valve E until the level drops to a point at which the float 24 is no longer buoyantly supported and the plunger 64 comes to rest in engagement with the sealing ring 51, thus closing the equalizer valve E and completely obstructing all communication between the chamber 24a and the passage 30.

It will be apparent that, once the differential pressure across the float 24 has been equalized, the float 24 affords sufficient buoyant force to lift or open the main float control valve by raising the valve element or downturned rim 35 from contact with the sealing ring or seat 34. The operating advantage resulting from this construction is that the full diameter of the float 24 is made available and offers the fastest response to a change in level during the defueling operation. The relatively small size of the equalizer valve E, consisting of the plunger 64 and the sealing ring 51, makes it possible for the float 24 to open it against a high differential pressure, whereas this same differential pressure, unless by-passed, would prevent the float from opening a valve such as the main float control valve 34—35.

It should be observed that when the float-operated valve 34—35 is in its open position, the float 24 is quite well shielded by the skirt 23 so that it tends to remain therein and clear of the sealing ring 34, irrespective of the direction of flow of the liquid. However, the hydraulic force holding the float 24 in the skirt 23 may be increased by forming an annular upwardly and inwardly inclined deflecting surface 33a on the seat ring 33 radially outward of the sealing ring 34, as shown best in FIGS. 6 and 13. The surface 33a deflects the downwardly flowing liquid upwardly and inwardly against the underside of the float 24, after which the deflected liquid rebounds and discharges through the passage 30.

It should also be observed that because of the annular groove 71 in the upper body section 1 which can be engaged by the latching balls 93 in any relative angular positions of the valves F and D, and because of the annular form of the groove 173 (or 176) which can be engaged by the ridges 172 (or 175) in any relative angular positions of the valves F and D, it is not necessary to angularly align the valves F and D before joining them. Having once been joined, the valve D can readily be swiveled into any angular position without danger of causing leakage.

The handles 156, in conjunction with the thick rubber bumper 97 (or 82), provide protection against breakage should the valve D be dropped, landing on its side, as no part likely to be easily damaged can strike the ground.

Having fully described my invention, it is to be understood that I do not wish to be limited to the details herein set forth, but my invention is of the full scope of the appended claims.

I claim:

1. A hydrant valve, comprising: a fixed valve structure for attachment to a pipe line; a detachable valve structure for connection to a fueling hose; a separable coupling carried by one of said valve structures for detachably joining said valve structures in end-to-end relationship; confronting inwardly opening valve elements at the joined ends of said valve structures; means in said detachable valve structure operatively engageable with both of said valve elements when brought into end-to-end relationship to effect simultaneous opening movement of said valve elements in opposite directions to permit flow between said pipe line and said fueling hose; a handle carried by said detachable valve structure for operating said last-mentioned means; and interlocking means on said handle and separable coupling for preventing the detachable valve structure from being removed from the fixed valve structure except when the valve elements of both valve structures are in closed position.

2. A hydrant valve as defined in claim 1, in which the means for preventing the detachable valve structure from being detached except when the valve elements are in closed position, comprises a pin slidably mounted on one of said valve structures and having a projection engageable in a recess in the operating handle and which recess is indexed with said pin only when the handle is in a position corresponding to the closed position of the valve elements.

3. A hydrant valve structure as defined in claim 2, in which the separable coupling is arranged to be moved upwardly to release the detachable valve structure from the fixed valve structure and wherein said separable coupling includes a portion engaged by said pin, and is prevented from being moved upwardly except when said pin is in registration with the recess in the operating handle.

4. A hydrant valve, comprising: a fixed valve structure for attachment to a pipeline; a detachable valve structure for connection to a fueling hose and for connection in end-to-end relation with said fixed valve structure; means detachably connecting said valve structures in said relationship; confronting valve elements at the joined ends of said valve structures; means in one of said valve structures operatively connected with both of said valve elements to effect simultaneous and positive actuation of said valve elements to open position to permit flow in a direction from said pipeline to said fueling hose during a refueling operation; float-operated valve means in one of said valve structures automatically operable, while said valve elements are open, to obstruct air flow from said fueling hose into said pipeline following depletion of liquid fuel flow from said fueling hose to said pipeline during a defueling operation; and means automatically actuated by said float means at the initiation of a defueling operation and while said valve elements are open for equalizing the pressure differential across said float-operated valve means to thereby permit automatic opening of said float-operated valve means.

5. A hydrant valve, comprising: a fixed valve structure for attachment to a pipe line; a detachable valve structure for connection to a fueling hose; a separable coupling joining said fixed and detachable valve structures in end-to-end relationship; confronting valve elements at the joined ends of said valve structures; means in said detachable valve structure operatively engageable with both of said valve elements to effect simultaneous opening of said valve elements to permit flow between said pipe line and said fueling hose; a float-operated valve in said fixed valve structure adapted, on depletion of liquid in said fixed valve, to move downwardly to close said fixed valve structure against the flow of gaseous fluid into said pipe line; and automatic means responsive to a rising movement of said float in said fixed valve structure for equalizing the pressures on opposite sides of said float-operated valve.

6. A hydrant valve, comprising: body means having a first opening for connection with a pipeline and a second opening for connection with a fueling hose; means in said body means for controlling the flow of fuel between said openings, said body means having a float chamber; a float in said chamber; a main float-operated valve means connected with said float arranged to control flow from said float chamber to said pipeline; and a by-pass valve means also controlled by said float arranged in by-passing relation to said main float-operated valve means for equalizing the pressure on opposite sides of said main float-operated valve means.

7. A hydrant valve comprising: a fixed valve structure for attachment to a pipeline; a detachable valve structure for connection to a fueling hose; means joining said valve structures in end-to-end relationship; confronting valve elements at the joined ends of said valve structures; means operatively engageable with both of said valve elements to effect simultaneous opening of said valve elements to permit flow between said pipeline and said fueling hose, said fixed valve structure having a float chamber; a float in said float chamber; a main float-operated valve means connected with said float arranged to control flow from said float chamber to said pipeline; and a relatively small by-pass valve means also operated by said float and arranged in by-passing relation to said main float-operated valve means for equalizing the pressures on opposite sides of said main float-operated valve means.

8. A hydrant valve, comprising: body means having a first opening for connection with a pipeline and a second opening for connection with a fueling hose; means in said body means for controlling the flow of fuel between said openings, said valve body means having a float chamber and having a seat above said first opening; a main float-operated valve means including a plate member having a portion engageable with said seat for controlling flow from said float chamber through said first opening; a float in said float chamber connected with said plate for moving said plate relative to said first opening to thereby control liquid flow through said first opening; a by-pass valve means mounted upon said plate, said by-pass valve means including a seat; means providing a limited sliding connection between said float and said by-pass valve means; and a valve element carried by said float and cooperable with the seat of said by-pass valve means for controlling the by-passing of liquid around said main float-operated valve means.

9. A hydrant valve, comprising: a fixed valve structure for attachment to a pipeline; a detachable valve structure for connection to a fueling hose and for connection in end-to-end relationship and in any relative angular position with said fixed valve structure; means detachably connecting said valve structures in said relationship; and replaceable axially interengaging means on said valve structures, cooperable in all relative angular positions of said valve structures, for preventing other than a given detachable valve structure from being mounted upon said fixed valve structure.

10. A hydrant valve as defined in claim 9, in which the means for preventing other than a given detachable valve structure from being mounted on the fixed valve structure, comprises a lug having an axially projecting ridge mounted on one of said valve structures and a cooperating axial recess in the other of said valve structures to receive said ridge.

11. A hydrant valve as defined in claim 9, in which the means for preventing other than a given detachable valve structure from being mounted on a fixed valve structure, comprises a lug having a projecting ridge mounted on one of said valve structures at a predetermined radial distance from the axis thereof and a cooperating annular groove of corresponding radius in the other of said valve structures for receiving said ridge.

12. A hydrant valve as defined in claim 5, including a handle for actuating the means in the detachable valve structure which effects simultaneous opening of the valve elements.

13. A hydrant valve as defined in claim 5, including mutually cooperable means on the separable coupling for preventing the detachable valves structure from being removed from the fixed valve structure except when the valve elements of both valve structures are in closed position.

14. A hydrant valve as defined in claim 5, including a handle for actuating the means in the detachable valve structure which effect simultaneous opening of the valve elements, and mutually cooperable means on the separable coupling for preventing the detachable valve structure from being removed from the fixed valve structure except when the valve elements of both valve structures are in closed position.

15. A hydrant valve as defined in claim 5, including cooperating means on the fixed and detachable valve structures for preventing other than a given detachable valve structure from being mounted upon said fixed valve structure.

16. A hydrant valve as defined in claim 7, including means providing a limited sliding connection between the float and by-pass valve means.

17. A hydrant valve, comprising a fixed valve structure for attachment to a pipeline; a detachable valve structure for connection to a fueling hose; a separable coupling carried by one of said valve structures for detachably joining said valve structures in end-to-end relationship; confronting valve elements at the joined ends of said valve structures; means in said detachable valve structure operatively engageable with both of said valve elements when brought into end-to-end relationship to effect simultaneous opening of said valve elements to permit flow between said pipeline and said fueling hose; a handle carried by said detachable valve structure for operating said last-mentioned means; float-operated valve means in one of said valve structures automatically operable, while said elements are open, to obstruct air flow from said fueling hose into said pipeline following depletion of liquid fuel from said fueling hose to said pipeline during a defueling operation; means connected to and automatically actuated by said float means at the initiation of a defueling operation for equalizing the pressure differential across said float-operated valve means to thereby permit automatic opening of said float-operated valve means; and mutually operable means on said handle and separable coupling for preventing the detachable valve structure from being removed from the fixed valve structure except when the valve elements of both valve structures are in closed position.

18. A hydrant valve as defined in claim 17, including ing cooperating means on said fixed and detachable valve structures for preventing other than a given detachable valve structure from being mounted upon said fixed valve structure.

19. A hydrant valve comprising: a fixed valve structure for attachment to a pipe line; a detachable valve structure for connection to a fueling hose; a separable coupling carried by one of said valve structures for detachably joining said valve structures in end-to-end relationship; confronting valve elements at the joined ends of the valve structures; means in said detachable valve structure operatively engageable with both of said valve elements when brought into end-to-end relationship to effect simultaneous opening of said valve elements to permit flow between said pipe line and said fueling hose; a handle carried by said detachable valve structure for operating said last-mentioned means; interlocking means on said handle and separable coupling for preventing the detachable valve structure from being removed from the fixed valve structure except when the valve elements of both valve structures are in closed position; and replaceable cooperating means on the fixed and detachable valve structures for preventing other than a given detachable valve structure from being mounted upon said fixed valve structure.

References Cited in the file of this patent

UNITED STATES PATENTS

| | | |
|---|---|---|
| 245,263 | Robb | Aug. 2, 1881 |
| 1,345,571 | Yates | July 6, 1920 |
| 1,738,809 | Walter | Dec. 10, 1929 |
| 1,979,850 | Young et al. | Nov. 6, 1934 |
| 2,239,590 | Class | Apr. 22, 1941 |
| 2,279,969 | Casperson | Apr. 14, 1942 |
| 2,625,410 | Crowley | Jan. 13, 1953 |
| 2,630,822 | Davies | Mar. 10, 1953 |
| 2,703,096 | Overbeke et al. | Mar. 1, 1955 |
| 2,836,207 | Griswold | May 27, 1958 |
| 2,855,961 | Wells | Oct. 14, 1958 |

FOREIGN PATENTS

| | | |
|---|---|---|
| 715,383 | Great Britain | Sept. 15, 1954 |